United States Patent Office 3,446,958
Patented May 27, 1969

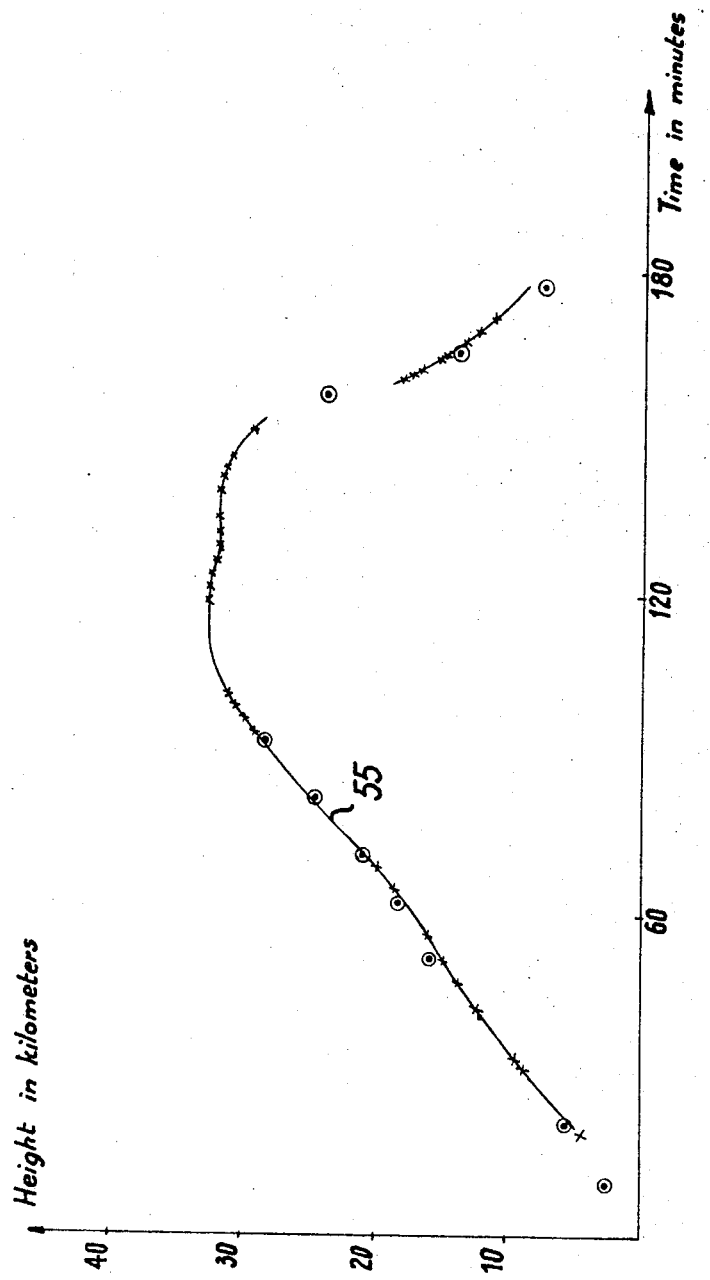

3,446,958
IONIZATION TYPE GAUGE USABLE OVER A WIDE RANGE OF PRESSURES
Francis G. Cambou and Francis L. Cotin, Toulouse, France, assignors to Centre National de la Recherche Scientifique, Paris, France, a French body corporate
Continuation-in-part of application Ser. No. 454,318, May 10, 1965. This application June 3, 1968, Ser. No. 734,132
Claims priority, application France, May 8, 1964, 973,760
Int. Cl. G01n 23/12, 21/26; H01j 37/08
U.S. Cl. 250—43.5                      2 Claims

ABSTRACT OF THE DISCLOSURE

In a pressure measuring ionization gauge included as a capacitor in a pulse generator to vary the pulse recurrence frequency thereof, said gauge comprising an ionization chamber having the shape of a hallow frustum of revolution bounded by a tapered metallic wall, having an aperture angle between 20° and 45°, a small open base and a large closed base, the wall of which is provided with slots permitting the peneration of air into said chamber, a radio-active particle source placed in the plane of the small base of the chamber, an ion-collector electrode placed along the axis of revolution of the chamber spaced apart from the particle source and in capacitive relationship with the chamber wall and means for applying an electric field between said ion-collector electrode and the chamber wall whereby said electric field is substantially transverse to the particle trajectories and becomes weaker with increasing distance from said source which improves the linearity of the gauge.

---

This application is a continuation-in-part of our patent application Ser. No. 454,318 filed May 10, 1965, now abandoned.

The present invention relates to a pressure gauge of the ionization type for measuring the absolute pressure of the atmosphere between sea level and very high altitudes of the order of 80 kilometers, and more particularly, to a device of this kind intended to be carried either by radiosonde balloons or by self-propelled machines.

Pressure gauges of the ionization type, often called Downing gauges, are well known in the art. They comprise a radio-active source, for example an alpha particle emitter such as radium 224, polonium 210, uranium 238 or a beta particle emitter such as strontium 90, cobalt 60, bismuth 210, positioned in an ionization chamber to radiate these particles into a space between two electrodes so as to ionize gas molecules in the chamber. Usually the wall of the chamber is one of the electrodes and the second electrode is an ion-collector mounted within chamber in spaced relationship therewith and maintained at a potential more negative than the potential of the chamber wall so as to collect the positive ions.

In the known alphatron devices, the ionization current which measures the pressure, is a DC current which varies with pressure, and necessitates the use of DC amplifiers in the measuring device. In addition, the range of pressure corresponding to the altitude range of 0–80 kilometers cannot be covered without at least two alphatrons since the alphatrons which are used to not have a linear response throughout the whole of this range of pressure. It is, therefore, necessary selectively to connect the alphatrons and the input resistors of the DC amplifiers in order to have at the output of the apparatus, an output signal of the order of volts, which can be applied to a telemetering equipment. These switching operations, which must be made at high impedance, are somewhat delicate.

Previous attempts have been made to give a Downing gauge a linear response over a wide range of pressures taking into account the variation with operating pressure of the mean range of the ionizing particles and the distance between the two electrodes. As the chamber wall is generally one of the electrodes, the distance to be considered is that between the inner electrode and the chamber wall.

It has been proposed to duplicate the alphatrons which then needs two ionizing agent radiating sources. It is also known to only duplicate the ionization chambers, i.e. to provide a small ionization chamber within a large ionization chamber, the two chambers using one and the same radio-active source. This solution does not exempt from the switching of the collector electrodes and the input resistors for the DC amplifier.

It has also been proposed to give the ion chamber the form of a frustum the wall of which being the collector, and the source of radiation the form of a cylindrical rod, this rod being at the same time the other electrode. This structure has the drawback to limit the ionizing agent which can be selected since they must at the same time serve as conductive equipotential electrode and also to increase the "dark current" since the ion collector electrode is directly bombarded by the alpha particles.

Finally it is known to embody a capacitor type ion chamber and an electrometer tube associated therewith in a pulse generator circuit in order to obtain recurrent pulses the frequency of which varies with respect to the pressure.

The object of the present invention is to provide an improved alphatron having a linear ionization current-pressure characteristic in the range from 760–10⁻² mm. of mercury.

Another object of the invention is to provide a device for measuring atmospheric pressure (or more accurately, the density of the atmosphere) throughout a wide range, without any switching, operating in a pulse mode and in such a manner that the recurrence frequency of the pulses is proportional to the atmopsheric density.

In accordance with the invention, the alphatron comprises a frustum-shaped chamber bounded by a slotted wall, having an angle of aperture of between 20° to 45° and forming the electron-collector electrode of the alphatron, a radio-active source placed against the inner surface of the small base of the chamber, and an ion-collector electrode in the form of a rod placed along the axis of the chamber and the electronic device associated with the alphatron comprises means for recharging the capacitor constituted by the chamber and the ion-collector electrode of the alphatron when the discharge of the capacitor has reached a certain value.

It results from the use of a truncated chamber together with the placing of the rado-active source against the small base of the chamber and the ion-collector electrode along the axis of the chamber that the particle trajectories are substantially orthogonal to the electric flux lines and the electric field is weaker as the particle range becomes larger. These conditions of orthoganility between the electric field and the particle free paths and of decreasing of the field versus the length of the range result in an increase in the linearity of the ionization current versus pressure characteristics towards the high pressures. The placing of the ion-collector electrode perpendicular to the source plane enables a reduction in the background current for low pressures by preventing direct impingement of the radio-active particles upon this electrode and this permits the use of a single alphatron for the whole of the range of pressures covered.

As a first approximation, the following explanation can be given but we desired that no binding of the scope of the invention will result therefrom.

Let $\lambda$ be the mean free path of the ionizing particles which, due to the frustum shape of the ion chamber travel along or close to the axial direction $z$ of the chamber. $\lambda$ is inversely proportional to the pressure $p$; hence $$\lambda = k/p \quad (k, \text{ constant})$$

Due to the law of distribution of free paths (see "Ionization Phenomena is Gases" by Gordon Francis, Butterworth's Scientific Publications, London 1960, page 13), the proportion $N/N_0$ of ion-electron pairs in function of $\lambda$ is:

$$N = pN_0 \epsilon^{-(z_0-z)/\lambda} = pN_0 \epsilon^{-(p/k)(z_0-z)}$$

Neglecting the mobility of the ions, de-ionization is principally due to the average drift velocity of the electrons in the electric field between the electrodes (see Gordon Francis, page 53). The current density $j$ is given by:

$$j = Nev_{\text{drift}} = ANeE(z)/p$$

where $A$ is a constant, $e$ is the charge of an electron and $E(z)$ is the electric field. Replacing $N$ by its value, we find:

$$j = AeN_0 \epsilon^{-(p/k)(z_0-z)} E(z)$$

The current density $j$ must be proportional to $p$ Identifying the expression for $j$ to $Bp$ ($B$, contant), we find:

$$E(z) \epsilon^{-(p/k)(z_0-z)} = Bp$$

By replacing the exponential by the tangent at the point $z = z_0$, it is found:

$$E(z) = \frac{Bp}{1 - \frac{p}{k} z_0 + \frac{p}{k} z}$$

If we take $1 - (p/k)z_0 = 0$, then:

$$E(z) = Bk/z$$

The field must become weaker as $z$ increase. This law is approximately fulfilled by giving the spacing between electrodes a value increasing with the distance from the source.

The invention will now be described in detail, with reference to the accompanying drawings, in which.

Figure 3:
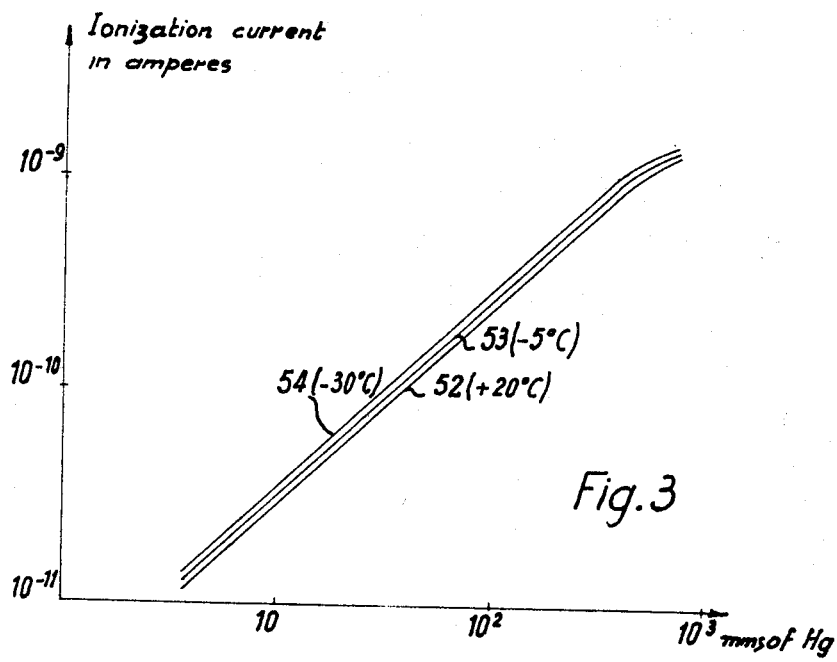

FIG. 3 shows the variation of the value of ionization current deduced from the pulse recurrence frequency for different air temperatures, and FIG. 4 is a curve showing the altitude of a radiosonde balloon carrying the pressure-measuring device in accordance with the invention, derived on the one hand from the indications of a radar set and on the other hand from the pressure-measuring device itself.

Figure 1:
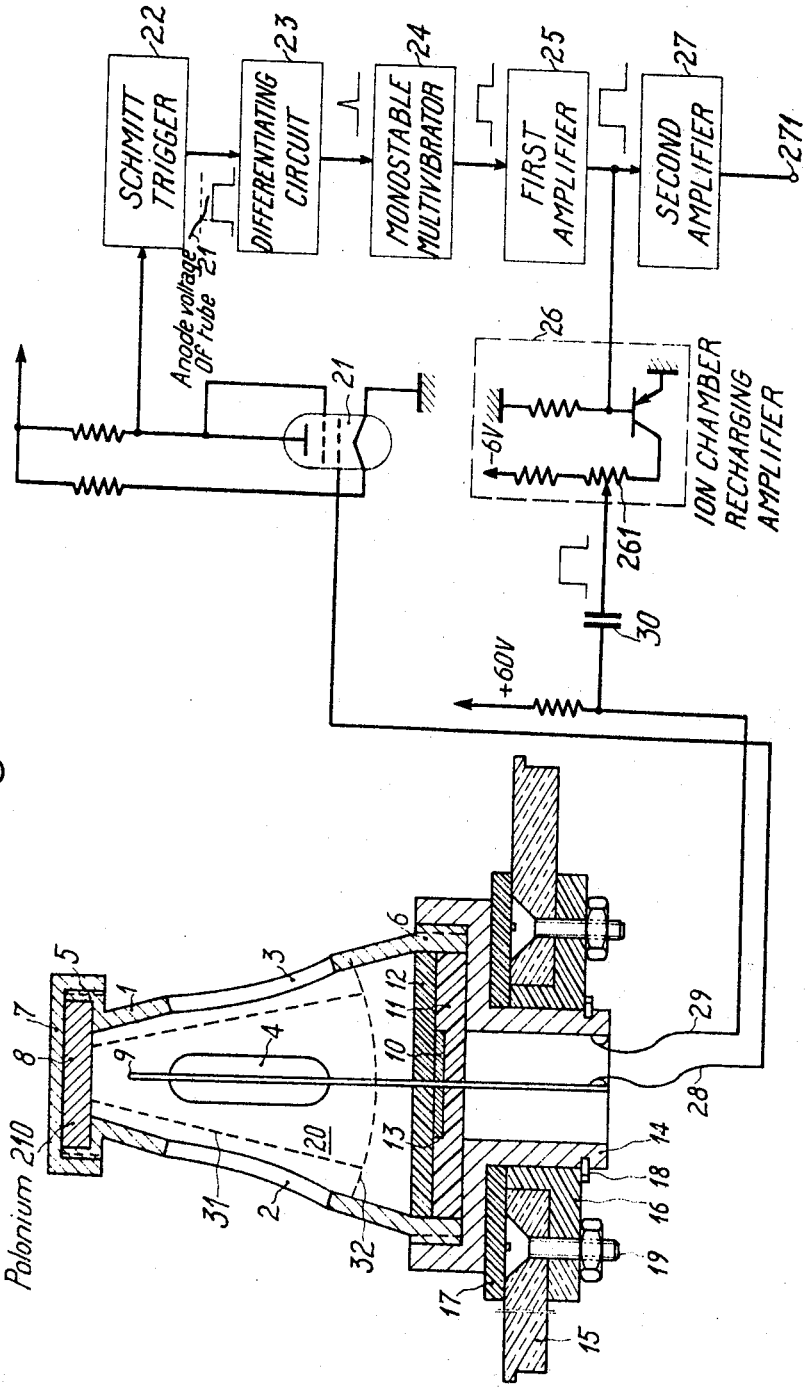
FIG. 1 is a sectional view by a diametral plane of the alphatron device and the diagram of the circuit associated therewith.

Referring to FIG. 1, the alphatron comprises a hollow body 1 of generally truncated form pierced by four slots such as the slots 2, 3 and 4 (the upper slot is not seen in FIG. 1). The tapered wall of body 1 defines an ionization chamber 20 and the slots allow the entry of air into the chamber. The body is terminated towards its small base by an open cylindrical part 5 of small height and having a diameter greater than that of the said small base, externally threaded and forming a compartment for the radio-active source 8. This compartment is not a part of the ion chamber and when the radio-active source 8 is inside the compartment, its emissive plane is flushed with the plane of the small base of the truncated chamber. The body is terminated at its larger end by an open and threaded cylindrical portion 6. Neither is this portion a part of chamber 20.

A cap 7, screws onto the part 5 and serves to hold in place the radio-active source 8. An ion-collector rod 9, of steel, having a diameter of 0.5 mm. and soldered at one place in its length to a brass disc 10 through which it passes, is placed along the axis of the conical chamber 20 of the alphatron. This collector rod is maintained in place by means of two insulating discs 11 and 12, housed in the cylindrical terminal portion 6 of the body of the alphatron. One of these discs 11, contains a depression, 13, which serves as a housing for the disc 10 and the other disc 12 maintains the disc 10 in this housing. The end 6 is screwed into a socket 14, and this socket is itself fixed to the wall 15 of a support by a circlip 18, which holds in place, one against the other, the radial flange of the socket 14, an insulating disc 17, the wall 15 and an insulating disc 16, having a central rim which rests on the axial portion of the socket 14. The members 15 and 16 are connected together by screws 19.

The insulating parts of this assembly may be of Teflon, for example.

As explained in the introductory part of the specification, if it is assumed at a rough estimate that the de-ionization is principally due to the average drift velocity of the electrons in the electric field, an electron at the point where it is formed must encounter an electric field inversely proportional to the distance from said point to the radio-active source. This condition is roughly met if the trajectories 31 of the particles are orthogonal to the flux lines 32 of the field.

In the ionization gauge of the invention, the radioactive source is located near the apex of the conical chamber, the wall of the chamber substantially gives the particle beam the form of an axial lobe and the electric field is substantially radial. If the aperture angle of the cone remains sufficiently small, say comprised between 20° and 45°, the strength of the electric field is inversely proportional to the distance from the source.

The ion-collector rod is connected through lead 28 to the grid of electrometer tube 21 the anode of which is connected to a chain of circuits comprising a Schmitt trigger circuit 22, a differentiating circuit 23, a monostable circuit 24, an amplifier stage 25, a zero-restoring amplifier 26 for the alphatron and an output amplifier 27. The output of amplifier 26 is connected through capacitor 30 and lead 29 to the wall of chamber 20.

The alphatron may be considered, for a given pressure, as a capacitor discharged at a constant current by the ions created in the ionization chamber. When the discharge of the capacitor reaches a given value, the electronic circuit provides a pulse which restores the potential of the collector electrode of the alphatron to its initial state, permitting the initiation of a further cycle of operation. The discharge time takes the form:

$$T = k/p$$

where $p$ is the pressure in millimeters of mercury and $k$ is a constant dependent upon the capacitance C of the ionization chamber in farads, the amplitude V of the ion chamber recharging pulse in volts, the ionization current $a$ in amperes which is created by a pressure of 1 mm. of mercury, the expression being $k = CV/a$. The discharge time being inversely proportional to the pressure, the pulse recurrence frequency is proportional to it.

The electrometer tube is of the CK.5886 kind. When the potential of its grid reaches a certain value, the voltage at its anode passes through the value at which the Schmitt circuit is triggered, and the Schmitt circuit then produces a signal of square waveform and of constant amplitude. The leading edge of this waveform is differentiated to give a sharp pulse by the differentiating circuit 23 and this sharp pulse is applied to the monostable circuit 24, which converts the sharp pulse into a pulse of predetermined duration, for example, 5 microseconds. This pulse is applied through the amplifier stage 25 to the ion chamber recharging amplifier 26 and to the output amplifier 27. The amplifier 26 comprises a variable resistor 261 in its last stage, which enables the adjustment of the amplitude of the charging pulse which is sent to the alphatron through the connection 29. The adjustment of the amplitude of the alphatron charging pulse enables the number of pulse per second for a given pressure to be selected; in addition, it enables compensation to be introduced for variation in the number of pulses per second, due to the decline of the radio-active source.

As the assembly comprising the grid of the electrometer tube and the collector electrode of the ion chamber is substantially completely isolated from the other parts of the circuit and from ground, it is capable of holding a negative electrostatic charge. Let us assume that at the beginning of ion-collection the potential of rod 9 is for example −5 volts, the electrometer tube being cut off. The collected ions discharge the ion chamber and the common potential of rod 9 and grid of tube 21 rise above cut-off voltage. For a vertain voltage above cut-off, 3 volts for example, the Schmitt trigger 22 operates. A large positive pulse of say 65 volts appears across the output terminal of ion chamber recharging amplifier 26. The positive electrode of the ion chamber is raised in potential from 60 volts to 60+65=125 volts and, due to the capacitance between the two electrodes of the chamber and the isolation of the negative electrode, the latter electrode is raised from 3 volts to 60 volts. When the pulse terminates, the positive electrode is reduced in potential to 60 volts and the negative electrode is reduced in potential to −5 volts and the cycle will repeat.

The output terminal 271, is connected to the input of a telemetering transmitter carried by the radiosonde balloon or the rocket and which forms no part of the invention.

The radio-active sources used in the experience of the applicant, are either sources of polonium 210 of a strength of about 50 microcuries, or foils containing a thin layer of titanium in which tritium of a strength of about one curie is absorbed.

Figure 2:
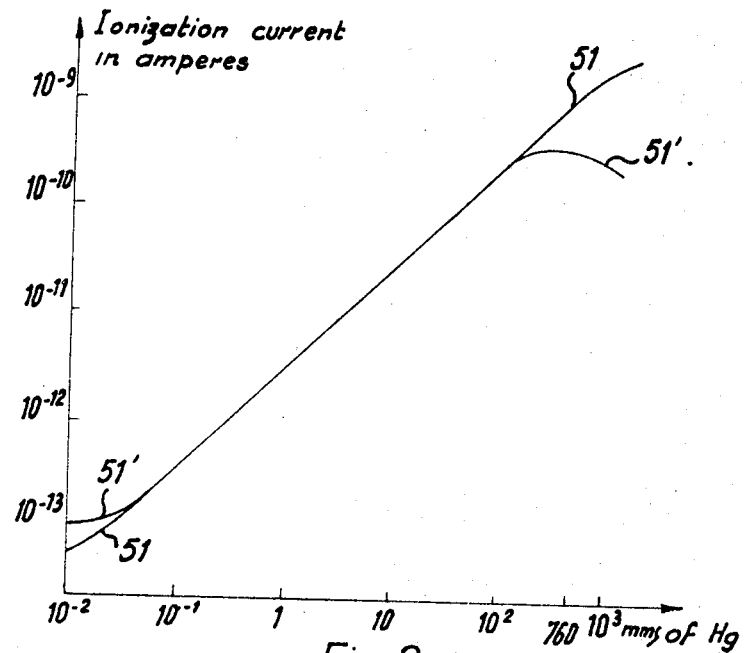
FIG. 2 shows the ionization current versus pressure characteristics of the pressure-measuring device.

The results obtained with this apparatus are illustrated by FIGS. 2–4.

The substantially linear ionization current versus pressure characteristic 51 obtained with the ionization gauge of the invention between $10^{-2}$ and 760 mm. of mercury is shown on FIG. 2. This characteristic was measured with a chamber biasing voltage of 60 volts, the end of the ion-collector electrode being spaced from the above mentioned polonium source by 3 mm.

In the same figure, the curve 51' is obtained with a conventional ionization gauge comprising a cylindrical ion chamber, a center electrode and a radio-active foil disposed against the wall of the chamber in the middle portion of the same. The diameter of the cylindrical gauge is approximately the same (1 in.) as the mean diameter of the truncated gauge. It can be seen that the ionization current corresponding to $10^{-2}$ mm. of Hg is $1.2 \cdot 10^{-13}$ A. in curve 51 and $10^{-13}$ A. in curve 51' and the ionization current corresponding to 760 mm. of Hg is $9.10^{-8}$ A. in curve 51 and $5.10^{-9}$ A. in curve 51'. Curve 51' exhibits a reversal between 100 mm. and 760 mm. of Hg which does not exist in curve 51.

FIG. 3 shows the variation of the ionization current derived from the pulse repetition frequency for different values of temperature. The curves relate to experiments made in a container in which it was possible to control independently of one another the pressure and the temperature. It shows that for a given pressure, the air density and the ionization current, which is proportional to it, are inversely proportional to the absolute temperature. Thus theoretically a relative change of temperature (in degrees Kelvin) and the same relative change of pressure brings about the same variation of ionization current, but with an opposite sign. The curves 52–54 which correspond to absolute temperatures spaced apart from each other by 10% show clearly that for a relative change of temperature of this value, there corresponds the same relative change, but of opposition sign, in the ionization current, the electronic equipment, which is temperature compensated, introducing an error which is only of the order of 1%.

FIG. 4 shows in the form of dots in circles, the altitudes of a radiosonde balloon derived from a tracking radar and in the form of crosses, the altitudes of this same radiosonde balloon, derived from apparatus embodying the invention; the altitudes in kilometers are shown as a function of time expressed in minutes. FIG. 4 shows that the "altitude-time" trajectories 55, provided by the radar set and the apparatus embodying the invention, are in good agreement.

As has been stated, the number of pulses per second can be adjusted by means of the resistor 261. Practical recurrence frequencies are, for example, depending upon the source used, from 1–3 Hz. for $10^{-2}$mm. of mercury and in the range 30,000–90,000 Hz. for normal atmospheric pressure.

What we claim is:

1. In a pressure measuring device including a pulse generator and a capacitor type ionization gauge inserted in said generator as a part thereof to vary the pulse recurrence frequency, said recurrence frequency being a measure of the pressure, an ionization gauge comprising an ionization chamber having the shape of a hollow frustum of revolution bounded by a tapered metallic wall, having an aperture angle comprised between 20° and 45°, a small open base and a large closed base, the wall of which is provided with slots permitting the penetration of air into said chamber, a radio-active particle source placed in the plane of the small base of the chamber, an ion-collector electrode placed along the axis of revolution of the chamber spaced apart from the particle source and in capacitive relationship with the chamber wall and means for applying an electric field between said ion-collector electrode and the chamber wall whereby said electric field is substantially transverse to the particle trajectories and becomes weaker with increasing distance from said source which improves the linearity of the gauge.

2. In a pressure measuring device including a pulse generator and a capacitor type ionization gauge inserted in said generator as a part thereof to vary the pulse recurrence frequency, an ionization gauge comprising an ionization chamber having the shape of a hollow frustum of revolution bounded by a tapered metallic wall having an aperture angle comprised between 20° and 45°, a small open base and a large closed base, the wall of which is provided with slots permitting the penetration of air into said chamber, a threaded flange terminating said chamber on the side of the small base, a threaded cap screwed onto said flange and defining therewith a circular compartment, a radio-active source placed in said compartment, an ion-collector electrode placed along the axis of revolution of the chamber, spaced apart from the particle source and in capacitive relationship with the chamber wall and means for applying an electric field between said ion-collector electrode and the chamber wall whereby said electric field is substantially transverse to the particle trajectories and becomes weaker with increasing distance from said source which improves the linearity of the gauge.

References Cited

UNITED STATES PATENTS

| | | | |
|---|---|---|---|
| 2,497,213 | 2/1950 | Downing | 324—33 |
| 2,739,283 | 3/1956 | Roehrig | 324—33 |
| 2,908,819 | 10/1959 | Marx. | |
| 2,994,768 | 8/1961 | Derfler. | |
| 3,009,098 | 11/1961 | Simons | 324—33 |
| 3,018,376 | 1/1962 | Vanderschmidt. | |
| 3,018,435 | 1/1962 | Vanderschmidt | 324—33 |

RUDOLPH V. ROLINEC, *Primary Examiner.*

C. F. ROBERTS, *Assistant Examiner.*